United States Patent [19]

Summers, Jr. et al.

[11] Patent Number: 5,602,071
[45] Date of Patent: Feb. 11, 1997

[54] BEAD FOR REMOVING DISSOLVED METAL CONTAMINANTS

[75] Inventors: Bobby L. Summers, Jr., Hudson; Lester B. Gress, Brecksville; Warren H. Philipp, Olmsted Twp.; Scott B. Eastep, Westlake, all of Ohio

[73] Assignee: Aero-Terra-Aqua Technologies Corporation, Cleveland, Ohio

[21] Appl. No.: 446,897

[22] Filed: May 17, 1995

Related U.S. Application Data

[63] Continuation-in-part of Ser. No. 249,733, May 26, 1994.

[51] Int. Cl.⁶ .............................. B01J 20/22; B01D 15/08; C02F 1/42
[52] U.S. Cl. ....................... 502/401; 210/660; 210/681; 210/688
[58] Field of Search ............................ 502/401; 210/660, 210/681, 688

[56] References Cited

U.S. PATENT DOCUMENTS

| | | | |
|---|---|---|---|
| 3,925,192 | 12/1975 | Randall et al. | 210/38 |
| 3,948,791 | 4/1976 | Tominaga et al. | 252/179 |
| 4,013,585 | 3/1977 | Terajima et al. | 252/427 |
| 4,067,821 | 1/1978 | Votapek et al. | 252/427 |
| 4,218,280 | 4/1980 | Philipp et al. | 156/272 |
| 4,239,865 | 12/1980 | Tarao et al. | 525/327 |
| 4,293,333 | 10/1981 | Drobot | 75/101 |
| 4,293,334 | 10/1981 | Drobot et al. | 75/101 |
| 4,352,883 | 10/1982 | Lim | 435/178 |
| 4,427,775 | 1/1984 | Chen et al. | 435/161 |
| 4,563,425 | 1/1986 | Yoshioka et al. | 435/94 |
| 4,626,416 | 12/1986 | DeVoe et al. | 423/12 |
| 4,690,894 | 9/1987 | Brierley et al. | 435/244 |
| 4,876,287 | 10/1989 | Babcock et al. | 521/28 |
| 4,908,137 | 3/1990 | Chen et al. | 210/679 |
| 4,909,944 | 3/1990 | Jackson et al. | 210/674 |
| 4,992,180 | 2/1991 | Onodera et al. | 210/688 |
| 5,096,946 | 3/1992 | Rainer | 524/30 |
| 5,108,614 | 4/1992 | Ross et al. | 210/665 |
| 5,206,206 | 4/1993 | Buelna et al. | 502/404 |
| 5,279,745 | 1/1994 | Jeffers et al. | 210/688 |
| 5,371,110 | 12/1994 | Philipp et al. | 521/28 |

OTHER PUBLICATIONS

Jeffers, T. H., et al., "Biosorption of Metal Contaminants Using Immobilized Biomass – A Laboratory Study", Report of Investigations 9340, U.S. Dept. of Interior, Bureau of Mines (1992).

Jeffers, T. H. et al., "Wastewater remediation using bio–fix bead technology", *Environmental Issues and Waste Management in Energy and Minerals Production*, (1992), pp. 1379–1387.

Bloom, P. R. and McBride, M. B., "Metal Ion Binding and Exchange with Hydrogen Ions in Acid–Washed Peat", *Soil Science Soc. Am. J.*, vol. 43 (1979), pp. 687–692.

Smith, E. F., et al., "Sulfuric Acid Treatment of Peat for Cation Exchange", *Journal WPCF*, Apr. 1977, pp. 633–638.

BIO–FIX Water Treatment Systems brochure from Harrison Western Environmental Services, (1991), pp. 1–4.

Mars Mineral MMC Pin Mixer brochure for MMC Mars Mineral, Mars, Pennsylvania (1985), pp. 1–2.

*Primary Examiner*—Helane Myers
*Assistant Examiner*—In Suk Bullock
*Attorney, Agent, or Firm*—Pearne, Gordon, McCoy & Granger

[57] ABSTRACT

A bead is provided which consists essentially of peat moss immobilized by crosslinked neutralized poly(carboxylic acid) binder, sodium silicate binder, or polysulfone binder. The bead is effective to remove metal contaminants from dilute aqueous solutions. A method of making metal-ion-sorbing beads is provided, comprising combining peat moss or other nonliving biomass and binder solution (preferably in a pin mixer where it is whipped), forming wet beads, and heating and drying the beads. The binder solution is preferably poly(acrylic acid) and glycerol dissolved in water and the wet beads formed from such binder solution are preferably heated and crosslinked by radio frequency heating.

20 Claims, 2 Drawing Sheets

BEAD FOR REMOVING DISSOLVED METAL CONTAMINANTS

BACKGROUND OF THE INVENTION

This application is a continuation-in-part of application Ser. No. 08/249,733, filed May 26, 1994, now allowed.

The present invention relates generally to beads, methods of making beads, and methods of using beads to remove metal contaminants dissolved in aqueous solutions. The beads preferably include peat moss and a binder and the peat moss, and preferably the binder, are capable of sorbing dissolved metal ions.

DESCRIPTION OF RELATED ART

The removal of metal contaminants from aqueous wastes such as acid mine drainage water and industrial waste water such as metal finishing waste water and municipal waste water, is an important environmental and economic issue. Some of the metal ions are toxic and some are valuable. In the chemical area of toxic metal recovery from dilute aqueous streams, the techniques of recovery have most commonly been by chemical precipitation, ion exchange, reverse osmosis, electrodialysis, solvent extraction (liquid ion exchange), and chemical reduction. (See U.S. Pat. No. 5,279,745). However, these procedures are characterized by the disadvantages of incomplete metal removal, high reagent and energy requirements, and generation of toxic sludge or other waste products that must be disposed of, and these disadvantages are particularly conspicuous at the low metal concentrations often encountered in waste waters, where federally-mandated cleanup standards dictate that effluents discharged to public waters generally contain less than 1 mg/L of metals such as copper, zinc, cadmium, lead, mercury and manganese.

Attempts to use biomass of living organisms for metal recovery have been expensive and troublesome, as noted in U.S. Pat. Nos. 5,279,745 and 4,690,894. The use of nonliving biomass such as fungus, molds, yeast, algae and peat as sorbents for metal ions has been attempted (see U.S. Pat. Nos. 4,293,334 and 4,690,894) with varying degrees of success, but limited uptake capacity and recovery of the metal-laden biomass have been problems. Immobilizing nonliving biomass in a granular or polymeric matrix has been suggested to improve biomass performance and facilitate separation of biomass from solution, see U.S. Pat. No. 5,279,745 and Jeffers, T. H. et al. *Biosorption of Metal Contaminants Using Immobilized Biomass—A Laboratory Study*, Report of Investigations 9340, U.S. Dept. of Interior, Bureau of Mines (1992) (the "Jeffers Report"). The Jeffers Report describes immobilization of peat moss in a polysulfone matrix, however, the manufacturing process utilizes dimethylformamide (DMF) as the solvent for the polysulfone, and the process produces beads which have less than optimal performance and which tend to be flat-sided or otherwise non-spheroidal, due to being sprayed into water during the formation step. DMF is a hazardous material the use of which should be avoided. Solvents for polysulfone are generally hazardous. Thus there exists a need for a more effective metal ion sorbent immobilized in a matrix in a mechanical shape such as a bead and for an effective, less-hazardous method of making such beads using binders or matrix materials which do not involve hazardous materials. Preferably the binder or matrix material itself is capable of sorbing metal ions. There is a further need for a process which makes beads which are more uniformly spheroidal than the prior art. Non-spheroidal beads tend to pack asymmetrically, tending to cause water flowing therethrough to flow in certain channels, rather than uniformly over all the beads. Among the objects of the present invention are to answer these needs.

SUMMARY OF THE INVENTION

A bead is provided which comprises peat moss and a binder, the binder preferably being poly(carboxylic acid) effectively crosslinked with a crosslinking agent and effectively neutralized with an alkali metal, an alkaline earth metal, or a mixture thereof. The peat moss is effectively immobilized in the bead. The bead is capable of sorbing a metal or metalloid dissolved in a dilute aqueous solution at a concentration of less than 10 ppm, said metal or metalloid being selected from the group consisting of silver, iron, chromium, cobalt, uranium, mercury, nickel, arsenic, aluminum, cadmium, lead, manganese, copper, and zinc. A method of making a metal-ion-sorbing bead is also provided. The method comprises:

(a) combining nonliving biomass, such as peat moss, and binder solution into a mixture, the binder solution comprising poly(carboxylic acid) and a crosslinking agent;

(b) forming the mixture into a first bead;

(c) heating said first bead to effectively crosslink the poly(carboxylic acid) with the crosslinking agent to form an effectively crosslinked binder; and (d) effectively neutralizing the crosslinked binder with an alkali metal, an alkaline earth metal, or a mixture thereof. A method of using the bead for removing a metal or metalloid from a dilute aqueous solution is also provided.

DETAILED DESCRIPTION OF THE PREFERRED EMBODIMENTS OF THE INVENTION

The terms sorb, sorbing, and sorption are used in the broad sense and as used herein are defined to include all forms of metal uptake and attachment, whether by adsorption, absorption, ionic bonding (including ion exchange), among other forms of metal uptake and attachment. Parts per million (ppm) and parts per billion (ppb) are parts by weight.

As used herein, the following terms have the following meanings. "Poly(carboxylic acid)" means a polymer including monomeric units which have a carboxylic acid functional group. The preferred poly(carboxylic acid) of the present invention is poly(acrylic acid). "Polyalcohol" means an organic compound that contains more than one hydroxy group. Glycerol and ethylene glycol are polyalcohols. The beads of the present invention includes poly(carboxylic acid) beads, sodium silicate beads, and polysulfone beads, as further described herein.

The nonliving biomass to be used in the present invention is preferably sphagnum peat moss, less preferably reed-sedge peat moss and cyprus peat moss. Other less-preferable peat mosses include heath, saw-grass, woody sedge, and sedimentary. It is believed that other less-preferable nonliving biomass materials may be used, including a marine algae (Ulva sp.), a blue-green algae, other types of peat, a yeast (*Saccharomyces cerevisiae*), common duckweed (Lemna Sp.), and alginate (a carbohydrate polymer) as described in the Jeffers Report (cited above) and U.S. Pat. No. 5,279,745, the entire contents of both of which are incorporated herein by reference.

The sphagnum peat moss preferably has a Von Post index of between about 7 and about 8, less preferably between about 5 and 9. Such sphagnum peat moss is available from Fafard Peat Moss Co., Ltd., Ste-Julie, Quebec, Canada. The peat moss preferably has a moisture content of about 20–50 weight percent prior to mixing with binder solution.

The peat moss is first sized with a screen having ⅛ inch mesh size to eliminate twigs and larger pieces, these larger pieces being shredded and added back to the unscreened material. The peat moss which passes the screen is dried to the appropriate moisture content, typically 20–50 weight percent, and then mixed with a binder solution and processed in one or more machines which yields beads or granules of peat moss mixed with binder.

The preferred binder solution is poly(carboxylic acid) and a crosslinking agent in water. The crosslinking agent crosslinks the poly(carboxylic acid) as described hereinafter. The poly(carboxylic acid) is preferably poly(acrylic acid), less preferably poly(methacrylic acid), less preferably those poly(carboxylic acids) which are like poly(acrylic acid) but which have fewer carboxylic acid functional groups per carbon chain length. More carboxylic acid functional groups per unit weight is advantageous, since there is more metal ion uptake capacity per unit weight. The poly(carboxylic acid) utilized preferably has a molecular weight of at least 10,000 and preferably not more than 500,000. More preferably the molecular weight is at least 80,000 and not more than 400,000, more preferably between 200,000 and 300,000. The preferred poly(carboxylic acid) is poly(acrylic acid), which is available from BF Goodrich Specialty Chemicals, Cleveland, Ohio, as Carbopol ISX-1794 (unneutralized version)(this product is, by weight, 75% water and 25% poly(acrylic acid), with the poly(acrylic acid) having a molecular weight of about 250,000, which is preferable).

The crosslinking agent is preferably polyalcohol. The polyalcohol is preferably glycerol, less preferably ethylene glycol, 1,2-propanediol, or 1,3-propanediol, less preferably poly(vinyl alcohol). The crosslinking agent is less preferably a polyamine, such as poly(ethylene imine), a tri-amine, or a diamine such as diamino butane.

The preferred binder solution is, by weight, about 60–98%, more preferably about 80–95%, more preferably about 85–92%, water, about 2–40%, more preferably about 5–20%, more preferably about 7–12%, poly(carboxylic acid), and about 0.1–15%, more preferably about 0.5–3%, more preferably about 1–2% polyalcohol or other crosslinking agent. A preferred binder solution is, by weight, about 0.1–15%, more preferably about 0.5–3%, more preferably about 1–2%, glycerol, about 2–40%, more preferably about 5–20%, more preferably about 7–12%, poly(acrylic acid), and about 60–98%, more preferably about 80–95%, more preferably about 85–92% water A preferred binder solution, by weight, is 1.6% glycerol, 36.9% Carbopol ISX-1794 (unneutralized), and 61.5% water, mixed at room temperature (72° F.).

A less preferred binder solution is a solution of sodium silicate in water. A starting material for this is product STIXSO RR from The PQ corporation, Valley Forge, Pa. 19482, which is by weight 9.2% $Na_2O$, 30% $SiO_2$, and 60.8% water. Product STIXSO RR is diluted at 70°–85° F. with water (preferably about 264 g STIXSO RR to 1000 g water, although it may be made more or less diluted) to provide the binder solution. Typically, the "wetter" the peat moss (the more free moisture), the more concentrated the binder solution that is used. Another sodium silicate starting material is Sodium Silicate N from The PQ corporation, which is 8.9% $Na_2O$, 28.7% $SiO_2$, and 62.4% water.

Figure 1:
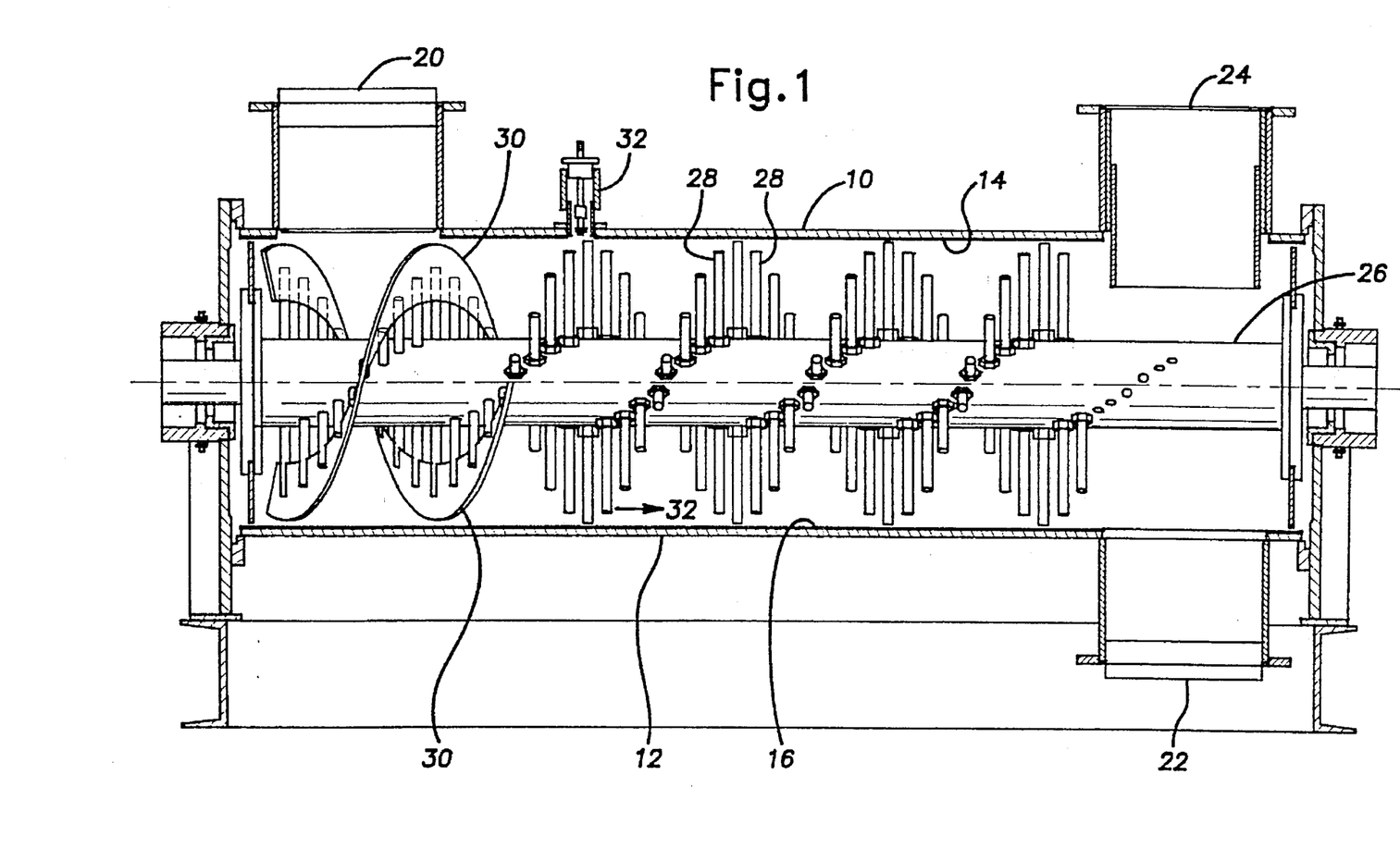
FIG. 1 is an elevational view with the exterior in section of a pin mixer for use in the present invention.

The screened peat moss and binder solution are preferably mixed and processed in an apparatus for mechanical spheronization to yield the mechanical shapes of granules or beads disclosed herein. An apparatus for mechanical spheronization produces spheroidal beads or granules. As used in the specification and claims, an apparatus for mechanical spheronization includes a pin mixer, and an Eirich mixer in combination with a disk pelletizer or spheronizer. The screened peat moss is preferably fed via a regulated screw feeder such as an Accuson screw feeder to a pin mixer. A preferred pin mixer is available from MMC Mars Mineral, P.O. Box 719, Mars, Pa. 16046, such as their Model 12D45L or Model 8D36L. Pin mixers are known devices, the details of which are known and are incorporated by reference. With reference to FIG. 1, the pin mixer has a cylindrical, stationary shell horizontally oriented with a length-to-diameter ratio of preferably between 2 and 5. Upper hemispherical shell 10 and lower hemispherical shell 12 form the cylindrical shell. Upper hemispherical shell 10 may be hinged so the mixer may be opened. The interior surfaces of the shells 10 and 12 are lined with sheet rubber 14 and 16. Inside the shell along its central axis is a shaft 26 with radially-extending rows of metal pins or rods 28. The pins 28, which are means to impart high shear forces, are arranged in a staggered, overlapping double helical pattern and extend into the chamber when the mixing takes place, the mixer shell enclosing the chamber. There is a close tolerance between the tips of the pins and the inside of the mixer shell, for example, 3/16 inch. Shaft rotational speed, and therefore tip speed, is high (several hundred RPM, a typical speed being 900 to 1700 RPM.) Optionally, a vent 24 may be provided. The pin mixer imparts high shear forces (particularly by means of its pins) and rotational forces as well as plug flow characteristics to the material being mixed.

The screened peat moss is entered at inlet 20, moved forward by vanes 30, and the liquid binder solution is sprayed onto the peat moss from nozzle 32. Additional nozzles can optionally be placed at other positions along the top of shell 10. The injection pressure of binder solution is preferably about 15 PSI, but will vary depending on viscosity. Preferably about 120 lbs. of the above-referenced 36.9% Carbopol, 1.6% glycerol solution is added per 100 lbs. of peat moss, depending on moisture content of the peat moss. Preferably about 137 lbs. of the 264:1000 sodium silicate binder solution described above is added per 100 lbs. of peat moss.

Preferably the material inside the pin mixer is 140°–170° F.; generally it takes about 20 minutes of operation to get to this temperature (frictional forces leading to temperature rise). Alternatively steam may be injected to raise the temperature or other means may be used.

The peat moss/binder solution mixture or media is whipped and mixed and rapidly stirred and high shear forces are imparted with rigid members in an air atmosphere (and not underwater) by the pins 28 as it moves as a plug flow or with plug flow through the shell in the direction indicated by arrow 32 to the bottom outlet 22, where it exits in the form of wet spheroidal beads or granules (typically about 1.18 to 2.36 mm in diameter) having a temperature typically of about 160° F., a bulk density of typically about 75 to 80 lbs/ft$^3$ for poly(carboxylic acid) beads and about 65 to 70 lbs/ft$^3$ for sodium silicate beads, and a moisture content, for poly(carboxylic acid) binder solution, of preferably about 45–60% by weight, and a moisture content for sodium silicate binder solution, of preferably about 60–70%, more preferably 64–68%, more preferably 66% by weight The typical production rate from a pin mixer with an 8 inch diameter tube is about 640 lbs/hr for poly(acrylic acid) binder solution and about 480 lbs/hr for sodium silicate binder solution. A bigger pin mixer will produce more.

It is important to control three variables: dry feed rate (rate at which peat moss is fed in), rate at which binder solution is added, and the temperature of the material inside the mixer (this temperature being largely influenced by the RPM rate, due to frictionally generated heat). These rates will vary depending on a number of factors, principally the size of the pin mixer. Preferably, a pressure gauge and temperature gauge are installed on the cylindrical shell to monitor operating conditions and parameters.

One advantage of a pin mixer is that residence time or retention time of the material in the mixer is controlled and limited, since the material moves as a plug flow down a path and then exits.

Alternatively, the wet beads may be produced by processing the peat moss and binder solution through an Eirich mixer and then through a disk pelletizer or spheronizer. An Eirich mixer is a high shear mixer available from the Eirich Company in Germany. The details and operation of an Eirich mixer are known and readily available and are incorporated by reference. It has a bowl or chamber in which the peat moss and binder solution are placed. The bowl turns in one direction and an S-shaped blade which descends into the bowl rotates at a high speed in the other direction, mixing and whipping and rapidly stirring with a rigid member the contents of the bowl and imparting high shear forces to the mixture. The Eirich mixer produces wet beads which typically are misshapen and not sufficiently round. The beads are then preferably taken from the Eirich mixer and are placed in an apparatus to improve the spheroidalness of the wet spheroidal beads. Suitable such apparatus include a disk pelletizer available from MMC Mars Mineral, and a spheronizer available from Niro, Inc., Columbia, Md. The details and operation of these devices are known and readily available and are incorporated by reference.

The wet poly(carboxylic acid) beads after exiting the pin mixer or apparatus for improving spheroidalness are heated to crosslink the poly(carboxylic acid) using the polyalcohol or other crosslinking agent to form a tough, strong, resilient, water insoluble, polymeric, plastic matrix or binder or structure for the bead. The peat moss is effectively immobilized in the bead so that the bead may perform effectively. When the crosslinking agent is polyalcohol, the alcohol functional group reacts with the carboxylic acid functional group to form an ester linkage, which reaction is repeated at many sites, yielding an ester crosslinked poly(carboxylic acid). Preferably, only the minimum number of carboxylic acid function groups are utilized in forming ester links or other links, since those remaining are then available for ion exchange, that is, metal ion uptake or sorption. Thus the amount of polyalcohol or other crosslinking agent used should be minimized. The poly(carboxylic acid) is effectively crosslinked when sufficient ester or other types of linkages have been formed to provide a polymeric matrix which provides effective structural support for the bead. Too much crosslinking leads to brittleness and less ion exchange capacity, too little crosslinking leads to insufficient structural support. The extent of crosslinking can be controlled by varying the heating method, the heating time, the heating temperature, and the concentrations of the reactants. If the crosslinking agent is a polyamine, the polyamine reacts with the poly(carboxylic acid) to form amide crosslinks.

The heating/crosslinking step for the wet poly(carboxylic acid) bead is preferably carried out by radio frequency (RF) heating. RF heating is a well-known process and is a type of dielectric heating. In RF heating, the beads are introduced into an alternating electric field and the molecules within the beads, particularly the water molecules, rotate and move several million times a second in an attempt to align with the changing electric field. The motion generates heat and the bead is heated. Radio frequencies for heating range from 2 to 200 MHz and are generated by a triode oscillator. The beads are preferably heated between plate electrodes. An appropriate RF heating oven is an 80 KW parallel plate RF heating oven available from PSC, Inc., Cleveland, Ohio 44117. Among the advantages of RF heating are quick heating (in the order of 10 minutes for the beads), uniform heating throughout the bead, and high energy efficiency. Uniform heating results in more complete crosslinking and thus greater strength; it is also believed to create greater porosity by the escape of vaporized water from throughout the bead. Alternatively, the heating may be done in a convection oven or other heating means. In a convection oven the crosslinking step is preferably carried out at a temperature of about 100°–150° C. for about 1 hour. Heating time depends principally on the temperature selected and initial moisture content of the beads. In a preferred process, heating is at 130° C. for 1 hour in a convection oven, with the beads having a moisture content of about 1% by weight when the reaction is done. Alternatively the crosslinking step can be accomplished using other means, such as a hot air dryer, a TURBO-Dryer as discussed herein, or a tumble dryer.

After the crosslinking step, the beads are preferably separated by size into large (retained on U.S. Standard Sieve No. 10), small (passes through U.S. Standard Sieve No. 20), and medium (passes through No. 10 above but is retained on No. 20 above, i.e. −10 +20). The beads may thereafter be stored dry and are believed to have an indefinite shelf life.

Subsequent to the crosslinking step described above, the uncrosslinked carboxylic acid functional groups of the beads are activated or conditioned or prepared for metal ion sorption by reaction or neutralization with an alkali metal, an alkaline earth metal, or a mixture thereof, preferably sodium, potassium, or calcium, more preferably sodium or calcium, more preferably calcium, to form the respective alkali metal salt or alkaline earth metal salt. A bead made with the 36.9% Carbopol, 1.6% glycerol binder solution is reacted or neutralized preferably as follows. 1.5 lbs. of hydrated lime, $Ca(OH)_2$, is mixed with 10–15 gallons of water to form a milky mixture, this 10–15 gallons of mixture then being mixed and reacted at room temperature with one cubic foot of beads. The reaction is continued until the milkiness disappears. The beads are then drained and are at that point referred to herein as soaked poly(carboxylic acid) beads. Preferably all the carboxylic acid sites are converted to the calcium salt to maximize ion exchange capacity. Alternative agents could be used, such as calcium acetate, sodium acetate, NaOH, NaCl, $CaCl_2$ in a 2% ammonia solution, or other similar materials containing the appropriate metals.

The neutralization procedure is similar to the hydrated lime procedure. As used herein and in the claims, "neutralized" means, with respect to alkali metals and alkaline earth metals, to react with one or more such metals and form the respective alkali metal salt or alkaline earth metal salt. The crosslinked poly(carboxylic acid) is effectively neutralized when sufficient of the carboxylic acid functional groups have formed the respective alkali metal salt or alkaline earth metal salt to provide measurable metal ion sorption.

The neutralized, crosslinked poly(carboxylic acid) beads produced as above, referred to as soaked poly(carboxylic acid) beads, have a high pH due to residual neutralizing solution and can be used as is if pH is not a concern, such as where the solution to be treated has a pH of 10–11. If pH is a concern, the pH can be lowered by rinsing with water. Preferably the soaked poly(carboxylic acid) beads are used without further drying. Preferably the soaked poly(carboxylic acid) beads are placed in a plastic-lined container and shipped to the site for use, although they may be dried to reduce shipping weight. If soaked poly(carboxylic acid) beads are dried, they lose about 30–40% of their bulk volume. There are two advantages to shipping the beads as soaked poly(carboxylic acid) beads. If they are shipped dry, they are more subject to abrasion damage during shipment. If they are shipped dry they may erroneously be installed dry in a container or device prior to use. When they are then hydrated, they tend to expand and may damage the container.

The soaked poly(carboxylic acid) beads preferably have the following physical characteristics: relatively spheroidal, bulk density—about 40 lbs/ft$^3$; 2 to 15, more preferably 4 to 10, more preferably 6 to 8, weight percent water, 65 to 94, more preferably 74 to 88, more preferably 78 to 84, weight percent dry peat moss, and 4 to 25, more preferably 8 to 16, more preferably 10 to 14, weight percent neutralized crosslinked poly(carboxylic acid) binder; 8 to 21, more preferably 12 to 17, parts by weight neutralized crosslinked poly(carboxylic acid) binder per 100 parts by weight dry peat moss; and crush strength of at least 15 lbs. (measured as described hereinafter). Preferably they are sized as large, medium, and small, using the same sizing and screening criteria described for sodium silicate beads hereinafter. The soaked poly(carboxylic acid) beads will tolerate without material damage temperatures up to 250° F., preferably 350° F., and they operate at a pH range preferably of 1.75 to 10, more preferably 4 to 9, more preferably 5.5 to 6. The beads have an internal porous structure so that water may penetrate and contact the peat moss and binder throughout the bead, both the peat moss and neutralized poly(carboxylic acid) binder having metal ion uptake capacity. This bead is more porous than the sodium silicate bead described herein.

The disclosed soaked poly(carboxylic acid) bead has advantages over the herein disclosed sodium silicate bead. It is physically stronger and more durable than the sodium silicate bead, is water insoluble, can operate at higher temperatures, and has inherently better metal uptake capacity because the poly(carboxylic acid) binder itself has metal uptake capacity and is a cation exchange material. Because the poly(carboxylic acid) binder solution is acidic (as opposed to being basic, like the sodium silicate binder solution), there is minimal neutralization of the humic and fulvic acids in the peat moss, resulting in minimal loss of humates and fulvates due to leaching, less than is the case with the sodium silicate binder solution. The resulting increased humic and fulvic acids in the beads contributes to an improved metal uptake capacity. Also, leaching tends to objectionably discolor the aqueous solution.

The wet sodium silicate beads after exiting the pin mixer or apparatus for improving spheroidalness are transported via conveyor or other means to a dryer, preferably a TURBO-Dryer available from Wyssmont Company, Inc., Fort Lee, N.J. or a dryer available from Carrier Corporation, such as their Model QAD-1260S-10.

Figure 2:
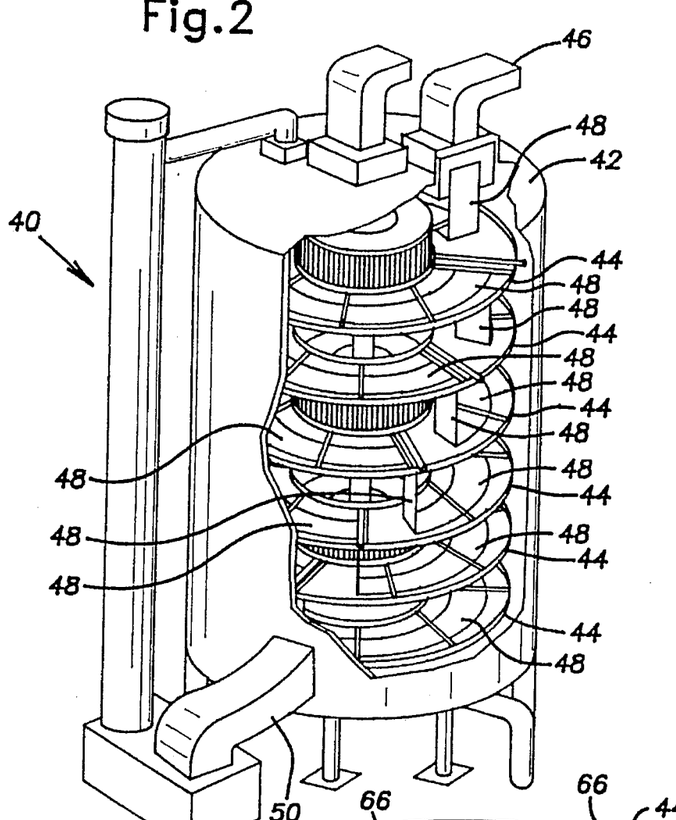
FIG. 2 is a perspective view with part of the casing cut away of a dryer for use in the present invention.
Figure 3:
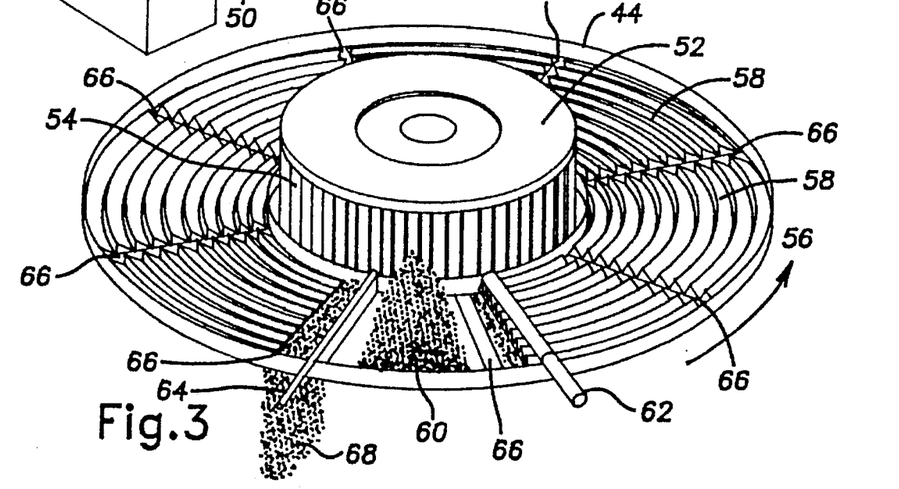
FIG. 3 is a perspective view showing in more detail one of the trays of the dryer of FIG. 2.

With regard to FIGS. 2 and 3, there is shown a TURBO-Dryer 40 from Wyssmont Company, Inc. Dryer 40 has a casing 42 containing trays 44. A tray is shown in more detail in FIG. 3. The wet beads enter at inlet 46 and are transported along a pathway indicated by 48 to outlet 50. With regard to FIG. 3, the tray 44, which rotates in the direction indicated by arrow 56, has a fan 52 with blades 54 blowing hot air radially outward across the beads which are in ridged panes 58. The beads fall from the tray above to location or position 60, are leveled by stationary leveler 62, and are carried around on the tray in ridged panes 58 until they meet stationary wiper 64. Stationary wiper 64 wipes the beads from the ridged panes 58 as the ridged panes pass underneath and drops the beads through the open slots 66 as they pass beneath, the beads then dropping to the tray below, as indicated at 68.

In the TURBO-Dryer the sodium silicate beads are dried with hot air (about 200° F.) and rolled, which maintains and enhances the spheroidal shape, which is the preferred shape. Other dryers known in the art can be used, preferably those which also roll the material. The sodium silicate beads are dried to a moisture content of preferably between about 5% and about 10% by weight. The beads shrink as they dry. The dried beads have a bulk density typically of about 35–45, more preferably about 40, lbs/ft$^3$. Air drying is not preferred; it is time-consuming, inefficient and does not roll the sodium silicate beads.

The dried sodium silicate beads, which are preferably spheroidal, less preferably globular or orbular, are then preferably screened to sort by size. Typically there are three sizes: large (passes through U.S. Standard Sieve No. 8 but is retained on U.S. Standard Sieve No. 10, i.e., −8 +10), medium (−10 +20), and small (−20 +50), although larger and smaller beads may also be used. The openings in U.S. Standard Sieve Nos. 8, 10, 20, and 50 are approximately 2360, 2000, 850, and 300 microns, respectively. These screened sodium silicate beads are dimensionally stable and have a bulk density of about 35–45, more preferably about 40, lbs/ft$^3$. Undersized beads, if used, may be too small and might plug or clog the equipment. They are preferably fed back into the pin mixer, to be blended with raw peat moss, or specially run in the pin mixer by themselves. Oversized beads may be ground or shredded to a smaller size and rescreened, or fed back to the pin mixer as above, either ground or unground. The foregoing description in this paragraph also applies to the poly(carboxylic acid) beads.

Bead density can be controlled by varying the amount and concentration of the binder solution added. Sodium silicate beads are peat moss, moisture, and sodium silicate binder, preferably 1 to 30, more preferably 1 to 20, more preferably 1 to 10, even more preferably 1 to 5, weight percent sodium silicate. Preferably there is an effective weight percent of sodium silicate binder to make the sodium silicate beads hard, resilient, durable and resistant to breakage, since the weight percent of sodium silicate may vary depending upon the commercial or industrial application. Beads made as described above with sodium silicate had a rating of 50+ on the 18 inch drop test, where the bead is dropped from a height of 18 inches repeatedly until it fractures. The value is the average number of drops until fracture. These beads also tested 15 lbs for crush strength (placed between two plates;

external pressure (in lbs) applied until bead fractures) and had 0% attrition loss (quantity of beads placed on a sieve and shaken for 5 minutes, the sieve openings being slightly smaller than the beads. Attrition loss is the percent that passes through). Preferably the beads have at least 10 lbs crush strength. The sodium silicate beads were relatively spheroidal (more spheroidal than the beads of the Jeffers Report), the spheroidalness resulting in more symmetrical packing and waste water flowing therethrough has less tendency to flow nonuniformly through certain channels. The sodium silicate beads preferably have a cation exchange capacity (CEC) (per the method of Dr. Bloom of the University of Minnesota) of 2 to 5, more preferably 4.5 to 5, milliequivalents per gram. The beads have an internal porous structure so that water may penetrate and contact the peat moss throughout the bead.

Other sizes of poly(carboxylic acid) and sodium silicate beads may be used, beyond those described above. Different applications typically require different bead sizes. Smaller beads have more surface area per pound and would tend to be preferred for lower flow rates of waste water and for lower concentrations of contaminants. For higher flow rates it may be preferable to mix small and large beads together. Larger beads tend to plug or clog less and may be preferred in less accessible locations.

The beads of the present invention are preferably contained within containers such as burlap sacks, filter cartridges, nylon sacks, porous containers (such as porous plastic or polymer containers (the plastic or polymer itself being porous) made by or through Porex Technologies of Fairburn, Ga.) and containers with filter paper or filter material at the inlet and outlet to retain the beads. Such containers, canisters, or columns are known in the art. Waste water can be flowed over and/or through the beads retained within such containers.

Undersized beads or fines, such as those that pass through U.S. Standard Sieve Nos. 100 or 200, have high surface area per pound and may be used as air filters to remove metal contaminants from air streams, such as removing lead and heavy metals from smelter air. In this application as an air filter the fines or small particles are preferably dried and physically fixed in a matrix or container, in various forms and shapes as required by the application, and/or are enclosed such as in filter cloth, etc., or otherwise used to make an air filter the same way activated carbon is used to make an air filter, which is well-known in the art.

An alternative and less preferred binder solution is polysulfone dissolved in methylene chloride, which is less hazardous than DMF. Preferably a fine powder polysulfone available from Amoco Performance Products, Inc., Alpharetta, Ga. as Product UDEL P-1800 NT is used. Preferably in an enclosed mixer and at about 70° F., approximately 35 lbs. of polysulfone is dissolved into each 300 lbs. of methylene chloride to form the polysulfone binder solution. The polysulfone binder solution is used in the process essentially the same as the sodium silicate binder solution. It is sprayed into the pin mixer onto the peat moss, however, typically about 300 lbs. of polysulfone binder solution are used per 100 lbs. of peat moss. Steps are taken to recover the methylene chloride, which is volatile and hazardous. The beads which come out of the pin mixer are dried in the dryer such as shown in FIG. 2, trying to remove as much methylene chloride as possible, again with solvent recapture. These beads are also sorted for size and preferably comprise 10 to 50, more preferably 20 to 30, weight percent polysulfone. These beads are porous, dimensionally stable, and preferably have physical characteristics comparable to the sodium silicate beads. These beads are less preferred because they use more hazardous materials.

Preferably the beads of the present invention are used to sorb metal and metalloid ion contaminants such as silver, iron, chromium, cobalt, uranium, mercury, nickel, arsenic, aluminum, cadmium, lead, manganese, copper, zinc and others from dilute aqueous solutions (pH preferably 4 to 9, more preferably 5.5 to 6, temperature preferably 33°–180° F., more preferably 50°–100° F.) such as acid mine drainage waters, in particular where the dissolved metals, such as heavy metals and transition metals, have concentrations less than 10 ppm, more preferably less than 1 ppm (mg/L), more preferably in the concentration range of 100 to 10 ppb. These metals and metalloids are elemental substances or elements. Such sorption is accomplished by bringing the dilute aqueous solutions into contact with the beads. The beads of the present invention are effective during relatively short contact times at 70° F. and at other temperatures, preferably 1 to 12 minutes, more preferably 2 to 6 minutes, in a fixed column. The beads are capable of greater than 99% removal efficiency in 2 minutes contact time (a flow rate of 30 BV/hr) in a fixed column for effluent containing 20 ppm copper and 20 ppm zinc at pH 6 and 70° F. The beads of the present invention exhibit selectivity for heavy metal ions over calcium and magnesium (a useful characteristic since calcium and magnesium frequently interfere with efficiency in this art) but are operable in waste streams with high concentrations of solids or metal ions. The beads work particularly well with copper, zinc, lead, cadmium, and mercury.

It is known that peat moss fixed in a polysulfone matrix in bead form can remove toxic and heavy metal ions from dilute aqueous solutions, particularly where the concentrations are less than 1 mg/L (sometimes referred to as "polishing"). See the Jeffers Report, cited above, the entire contents of which are incorporated by reference. The beads of the present invention can be substituted for the beads in the Jeffers Report and used in the same way and it is believed that they will perform comparable to or better than those beads.

The advantages of the invented beads over the beads of the Jeffers Report are several. The peat moss/poly(carboxylic acid) beads are physically strong, water insoluble, are made with a less hazardous, simpler process, and both the peat moss and binder have metal ion uptake capacity. The peat moss/poly(carboxylic acid) and peat moss/sodium silicate beads are made using far less hazardous materials and using a process which is simpler, more efficient, less expensive, and which produces more spheroidal beads. The invented peat moss/polysulfone beads are made without using DMF and using the simpler, more efficient process referenced above.

It is believed that the present peat moss/poly(carboxylic acid) beads will generally remove heavy metal ions at least as well as the peat moss/sodium silicate beads and somewhat better than those made with polysulfone, although all three are effective. The poly(carboxylic acid) and polysulfone binders are generally more stable physically than the sodium silicate and may work better where the pH is 8 or higher. The poly(carboxylic acid) and polysulfone beads are water-insoluble and are more temperature resistant and can operate at 120°–180° F. and at higher than 180° F. as well as at 32°–120° F. The sodium silicate beads are preferably used at temperatures below 120° F.; the sodium silicate binder may lose its shape and/or partially dissolve in an aqueous solution at or above 120° F.

Optionally the peat moss may be pretreated by acid washing prior to being mixed with binder solution, to improve the performance of the peat moss. To acid wash, mix or wash the peat moss (possibly dampened) with acid, preferably 60–80% sulfuric acid (less preferably hydrochloric acid or other mineral acid, but not nitric acid), preferably for about 4 hours, drain, and rinse with water, preferably until the pH is about 3–4. Then remove some of the moisture, preferably until the peat moss is 40–60% moisture by weight, preferably by spin drying, less preferably by air drying or drying in a heated dryer. Preferably do not acid wash so much that the humic or fulvic substances are removed. Acid washing removes waxes and bitumens, which tend (a) to interfere with the operation and effectiveness of the peat moss in sorbing metal ions, and (b) to leach out, discoloring the water being treated. This leaching phenomenon may increase the chemical oxidation demand (COD) and decrease the pH. Thus, generally acid wash until the discoloring material is reduced. Suitable acid washed peat moss (acid washed using a comparable technique) is also available from Prodex, Inc., Akron, Ohio.

The beads of the present invention can be effectively regenerated by (a) passing one to three, preferably two, bed volumes of 1.5 to 3% $H_2SO_4$ (unless lead is present, in which case use 1 to 2% nitric acid) through the bead-filled container at an upflow rate of 6–10 bed volumes per hour (BV/hr); (b) passing one bed volume of $H_2O$ (preferably deionized) through said container at the same rate; (c) for poly(carboxylic acid) beads passing two bed volumes of a slurry containing 1.5 lbs. of $Ca(OH)_2$ per 15 gallons of water through said container at the same rate, and for the other beads passing two bed volumes of 0.07 to 0.2M $Na_2CO_3$ through said container at the same rate; and (d) repeating step (b). By this technique valuable metal contaminants can be recovered from the beads in solutions amenable to further processing, and regenerated beads can be reused. The valuable metal contaminants can subsequently be recovered from the solutions using techniques known in the art. The invented beads can be reused and cycled through the regeneration procedure many times and still be effective.

It is also possible to run the beads through the above regeneration procedure prior to the time the beads are first used. This is sometimes referred to as pre-conditioning the beads. Generally it is not economical to pre-condition the beads prior to their first use. Unpre-conditioned beads, on first use, are typically about 80 to 95% as efficient as pre-conditioned beads on first use. When unpre-conditioned beads are regenerated after first use, they get to near their peak efficiency. The beads of the present invention will generally increase slightly in efficiency through the first few (up to about 7) regeneration cycles.

The following Examples illustrate various aspects of the present invention.

EXAMPLE 1

Peat moss/sodium silicate beads were produced as described above without acid washing. These beads were placed in a 1 L column and subjected to a municipal sludge dewatering leachate at room temperature with a pH of 5 that contained 1.2 ppb Hg. Using an upflow mode with a rate of 6 bed volumes/hr (BV/hr), the effluent after one pass was measured to be non-detectable (less than 0.4 ppb). 6 BV/hr= 10 minutes contact time. This demonstrates the ability to achieve removal results in the non-detectable ppb range, and it is believed that results with other metal contaminants including copper, zinc, cadmium, lead, and nickel would be comparable.

EXAMPLE 2

Beads made as in Example 1 were placed in a 1 L column and subjected to a room temperature test effluent that contained 49.4 ppm Zn at a pH of 7. Using an upflow mode with a rate of 10 BV/hr, the effluent after one pass was measured to be 0.37 ppm Zn. This demonstrated high removal efficiency (99.1%) at a higher flow rate, and an ability to operate efficiently at a higher than normal pH (ie, 7).

EXAMPLE 3

Beads made as in Example 1 were placed in a 6.25 L column and subjected to a room temperature test effluent at a pH of 6 that contained 8.95 ppm Zn. Using an upflow mode with a rate of BV/hr, the effluent after one pass was measured to be 73 ppb, thus demonstrating high removal efficiency (99.2%) and an ability to operate efficiently in the ppb range.

EXAMPLE 4

Beads made as in Example 1 were placed in a 2 L column and subjected to a plating rinse effluent at room temperature and pH of 4.5 that contained 7.41 ppm Cu, 0.95 ppm Ni, and 0.90 ppm Pb. Using a downflow mode with a rate of 30 BV/hr (2 minutes contact time), the effluent after one pass was 7 ppb Cu, below detectable limits Ni, and less than 1 ppb Pb, thus demonstrating high removal efficiencies, the ability to operate efficiently at higher flow rates and in the ppb range, all in a multiple metal effluent.

EXAMPLE 5

Beads made as in Example 1 were placed in a 6.25 L column and subjected to a plating rinse effluent at room temperature that contained 2.02 ppm Zn at a pH of 12. Using an upflow mode with a rate of 10 BV/hr, the effluent after one pass was 0.28 ppm Zn, thus demonstrating high removal efficiency (86.1%) at an extremely basic pH. Also, the beads maintained their mechanical shape (spheroidal) in this elevated pH, demonstrating substantial mechanical qualities.

EXAMPLE 6

Beads were prepared using a bench scale mixing/drying process combining peat moss with polysulfone dissolved in methylene chloride. The resulting beads were (by volume) about 74% peat moss, about 25% polysulfone, and less than 1% methylene chloride. About 0.01 L of these beads were placed in a test reactor along with about 0.5 L of effluent at room temperature and pH of 6.5 containing 20 ppm Mn, 20 ppm Co, 20 ppm Fe, and 15 ppm Ni. The material was stirred. After 5 minutes the sample effluent was 0.38 ppm Mn, 0.61 ppm Co, 1.23 ppm Fe, and 0.9 ppm Ni. At 10 minutes the sample effluent was 0.27 ppm Mn, 0.4 ppm Co, 1.03 ppm Fe, and 0.9 ppm Ni. At 60 minutes the sample effluent was 0.2 ppm Mn, 0.31 ppm Co, 1.01 ppm Fe, and 0.87 ppm Ni. This demonstrates a rapid and efficient removal rate in a multiple metal effluent. A comparable test was run using polysulfone beads made as set forth in the Jeffers Report; at 5 minutes the effluent was from 7 to 10 ppm for each metal, at 10 minutes from 4 to 6 ppm for each metal, and at 30 and 60 minutes from 1 to 2 ppm for each metal.

EXAMPLE 7

Beads A, B, C, and D were tested. Bead A was made as in Example 1. Beads B, C, and D were made with 1.6% glycerol and 36.9% Carbopol ISX-1794 as described above. Beads A, B, C, and D were made in a pin mixer the cylindrical chamber of which was eight inches in diameter. Beads A, B, C, and D were medium size as described above (−10 +20 after being dried and heated in the convection oven). 15 g of dry beads, ie, after the convection oven, of each of A, B, C, and D were used. The 15 g of Bead A were permitted to swell in deionized water before being drained and placed in a 1 L beaker. Beads B, C, and D were activated or neutralized with aqueous solutions of NaOH, calcium acetate, and $Ca(OH)_2$, respectively, as described above (for example, a 10–20% solution of NaOH was slowly added to Beads B until the pH stabilized at about 10) and then rinsed in deionized water and drained and placed in respective 1 L beakers.

Three loading and regeneration cycles, all at room temperature (about 70° F.) were run. Each cycle was as follows. 15 g of beads (dry weight) were soaked and placed in a 1 L beaker as described above. 250 ml of a concentrated copper aqueous solution (about 2700 ppm Cu; pH of 4) was added and stirred for about 2.5 hrs. The copper loaded beads were then drained and rinsed with a small amount of deionized water and regenerated by adding 250 ml of 3% sulfuric acid solution and stirring for about 2 hrs. The sulfuric acid stripped the Cu from the beads. The Cu content of the sulfuric acid solution was then measured to determine the loading capacity of the beads. The cycle was then repeated. Loading capacity was calculated as lbs. of copper per cubic foot of soaked beads and was measured as follows.

| | Loading Capacity Lbs Cu per Cubic Foot Soaked Beads | | |
|---|---|---|---|
| Bead | Cycle 1 | Cycle 2 | Cycle 3 |
| A | 0.28 | 0.32 | 0.39 |
| B | 0.40 | 0.80 | 0.58 |
| C | 0.57 | 0.77 | — |
| D | 0.97 | 1.10 | 1.00 |

The test results show superiority of poly(acrylic acid) beads over sodium silicate beads and superiority of $Ca(OH)_2$ activation of the poly(acrylic acid) beads.

EXAMPLE 8

Beads F and G were tested. Beads F and G were made the same as Bead D in Example 7, except that the beads were made in a pin mixer the cylindrical chamber of which was twelve inches in diameter and Bead G, when it was sized, was the large size, that is, what was retained on U.S. Standard Sieve No. 10. One loading/regeneration cycle was performed and the loading capacity was measured as follows, in lbs. Cu per cubic foot soaked beads.

| Bead | Loading Capacity |
|---|---|
| F | 1.29 |
| G | 1.00 |

The test results show that, surprisingly and unexpectedly, the bead made with a 12 inch diameter pin mixer has a higher loading capacity than the same bead made with an 8 inch diameter pin mixer—compare Bead F with Bead D. Also, the medium size beads have a higher loading capacity than the large size beads—compare Bead F with Bead G.

EXAMPLE 9

Bead H was tested. Bead H was made the same as Bead F above except that it was dried and crosslinked in an RF heating oven (it took only 9 minutes) rather than a convection oven. One loading/regeneration cycle was performed and the loading capacity of Bead H was measured as follows, in lbs. Cu per cubic foot soaked beads.

| Bead | Loading Capacity |
|---|---|
| H | 1.56 |

The test results show that, surprisingly and unexpectedly, the beads heated with RF heating have a higher loading capacity than the same beads heated in a convection oven—compare Bead H with Bead F. It is believed that this is due to the quicker, deeper, and more uniform RF heating, which is believed to provide better porosity.

It should be evident that this disclosure is by way of example and that various changes may be made by adding, modifying or eliminating details or elements without departing from the fair scope of the teaching contained in this disclosure. The invention is therefore not limited to particular details of this disclosure except to the extent that the following claims are necessarily so limited.

What is claimed is:

1. A bead comprising peat moss and a binder, said binder being poly(carboxylic acid) effectively crosslinked with a crosslinking agent and effectively neutralized with an alkali metal, an alkaline earth metal, or a mixture thereof, said peat moss being effectively immobilized in said bead, said bead being capable of sorbing a metal or metalloid dissolved in a dilute aqueous solution at a concentration of less than 10 ppm, said metal or metalloid being selected from the group consisting of silver, iron, chromium, cobalt, uranium, mercury, nickel, arsenic, aluminum, cadmium, lead, manganese, copper, and zinc.

2. A bead according to claim 1, wherein said crosslinking agent is a polyalcohol or a mixture of polyalcohols.

3. A bead according to claim 2, wherein said poly(carboxylic acid) is selected from the group consisting of poly(acrylic acid), poly(methacrylic acid), and mixtures thereof.

4. A bead according to claim 2, wherein said poly(carboxylic acid) is poly(acrylic acid).

5. A bead according to claim 4, wherein said poly(acrylic acid) has a molecular weight between 10,000 and 500,000.

6. A bead according to claim 1, wherein said crosslinking agent is selected from the group consisting of glycerol, ethylene glycol, 1,2-propanediol, 1,3-propanediol, and mixtures thereof.

7. A bead according to claim 4, wherein said crosslinking agent is glycerol.

8. A bead according to claim 1, wherein said alkali metal is sodium and said alkaline earth metal is calcium.

9. A bead according to claim 7, wherein said alkali metal is sodium and said alkaline earth metal is calcium.

10. A method of making a metal-ion-sorbing bead, said bead being effective to sorb metal ions from a dilute aqueous solution, said metal being selected from the group consisting of silver, iron, chromium, cobalt, uranium, mercury, nickel, aluminum, cadmium, lead, manganese, copper, and zinc, the method comprising the steps of:

a) combining nonliving biomass and binder solution into a mixture, said binder solution comprising poly(carboxylic acid) and a crosslinking agent;

b) forming the mixture into a first bead;

c) heating said first bead to effectively crosslink said poly(carboxylic acid) with said crosslinking agent to form an effectively crosslinked binder; and d) effectively neutralizing said crosslinked binder with an alkali metal, an alkaline earth metal, or a mixture thereof.

11. A method according to claim 10, wherein said nonliving biomass is peat moss and said crosslinking agent is a polyalcohol or a mixture of polyalcohols.

12. A method according to claim 11, wherein said poly(carboxylic acid) is selected from the group consisting of poly(acrylic acid), poly(methacrylic acid), and mixtures thereof, and wherein said crosslinking agent is selected from the group consisting of glycerol, ethylene glycol, 1,2-propanediol, 1,3-propanediol, and mixtures thereof.

13. A method according to claim 12, wherein said poly(carboxylic acid) is poly(acrylic acid) and said crosslinking agent is glycerol.

14. A method according to claim 10, wherein said heating is by radio frequency heating.

15. A method according to claim 13, wherein said heating is by radio frequency heating.

16. A method according to claim 10, wherein said forming of said mixture is by use of a pin mixer.

17. A method of removing a metal or metalloid ion from a dilute aqueous solution in which said ion is present, said method comprising the steps of:

a) contacting said solution with a bead for a period of time sufficient to allow said bead to sorb said ion, said bead comprising peat moss and a binder, said binder being poly(carboxylic acid) effectively crosslinked with a crosslinking agent and effectively neutralized with an alkali metal, an alkaline earth metal, or a mixture thereof, said peat moss being effectively immobilized in said bead; and b) sorbing said ion onto said bead.

18. A method according to claim 17, further comprising the step of removing said sorbed ion from said bead and regenerating said bead so that said bead may be reused.

19. A bead according to claim 5, wherein said poly(acrylic acid) has a molecular weight between 80,000 and 400,000.

20. A bead according to claim 19, wherein said poly(acrylic acid) has a molecular weight between 200,000 and 300,000.

* * * * *

UNITED STATES PATENT AND TRADEMARK OFFICE
CERTIFICATE OF CORRECTION

PATENT NO. : 5,602,071
DATED : February 11, 1997
INVENTOR(S) : Bobby L. Summers, Jr., et al.

It is certified that error appears in the above-indentified patent and that said Letters Patent is hereby corrected as shown below:

Col. 3, line 65, delete "16%" and insert therefor --1.6%--.

Signed and Sealed this

Sixth Day of May, 1997

Attest:

BRUCE LEHMAN

Attesting Officer

Commissioner of Patents and Trademarks